United States Patent
Funayama

(10) Patent No.: US 12,412,304 B2
(45) Date of Patent: Sep. 9, 2025

(54) PARAMETER DETERMINATION APPARATUS, PARAMETER DETERMINATION METHOD AND RECORDING MEDIUM

(71) Applicant: NEC Corporation, Tokyo (JP)

(72) Inventor: Chisato Funayama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 499 days.

(21) Appl. No.: 17/777,666

(22) PCT Filed: Nov. 21, 2019

(86) PCT No.: PCT/JP2019/045549
§ 371 (c)(1),
(2) Date: May 18, 2022

(87) PCT Pub. No.: WO2021/100163
PCT Pub. Date: May 27, 2021

(65) Prior Publication Data
US 2023/0035740 A1 Feb. 2, 2023

(51) Int. Cl.
*G06T 7/80* (2017.01)
*G06V 40/16* (2022.01)

(52) U.S. Cl.
CPC ............. *G06T 7/80* (2017.01); *G06V 40/161* (2022.01); *G06T 2207/30201* (2013.01); *G06T 2207/30244* (2013.01)

(58) Field of Classification Search
CPC ... G06T 7/80; G06T 7/97; G06T 2207/30201; G06V 40/161; G06V 40/168

USPC .......................................... 382/118, 190, 274
See application file for complete search history.

(56) References Cited

U.S. PATENT DOCUMENTS

| | | | |
|---|---|---|---|
| 2008/0292145 A1 | 11/2008 | Kuniba | |
| 2009/0322899 A1 | 12/2009 | Chan et al. | |
| 2010/0231712 A1* | 9/2010 | Suenobu | H04N 23/71 348/135 |
| 2015/0116543 A1* | 4/2015 | Mitarai | G06V 10/993 348/231.6 |
| 2015/0339537 A1* | 11/2015 | Ikeda | H04N 23/611 382/103 |

FOREIGN PATENT DOCUMENTS

| | | |
|---|---|---|
| JP | 2006-268180 A | 10/2006 |
| JP | 2007-310491 A | 11/2007 |

(Continued)

OTHER PUBLICATIONS

Extended European Search Report for EP Application No. 19 953 015.5, dated on Nov. 2, 2022.

(Continued)

*Primary Examiner* — Jamares Q Washington

(57) ABSTRACT

A parameter determination apparatus (3) includes: a calculation unit (313) that is configured to calculate, based on a recognized result of a plurality of recognition target images by a recognition apparatus (2) that performs a recognition operation on the recognition target image (100, 200), an evaluation value for evaluating the recognized result; and a determination unit (314) that is configured to determine, based on the evaluation value, an image generation parameter (300, 301, 302 303b) that is used to generate the recognition target image.

12 Claims, 7 Drawing Sheets

(56) References Cited

FOREIGN PATENT DOCUMENTS

| JP | 2012-198680 A | 10/2012 |
|----|---------------|---------|
| JP | 2017-130794 A | 7/2017 |
| WO | 2009/066364 A1 | 5/2009 |
| WO | 2014/002398 A1 | 1/2014 |

OTHER PUBLICATIONS

Jaroensri Ronnachai et al., "Predicting Range of Acceptable Photographic Tonal Adjustments", 2015 IEEE International Conference on Computational Photography (ICCP), IEEE, Apr. 24, 2015, pp. 1 to 9.

Lianping Chen et al., "Effects of Different Gabor Filter Parameters on Image Retrieval by Texture", Multimedia Modelling Conference, 2004 Proceedings. 10th International Jan. 5 to 7, 2004, Piscataway, NJ, USA, IEEE, Jan. 5, 2004, pp. 273 to 278.

International Search Report for PCT Application No. PCT/JP2019/045549, mailed on Feb. 18, 2020.

US Office Action for U.S. Appl. No. 18/385,969, mailed on Aug. 28, 2024.

US Office Action for U.S. Appl. No. 18/385,969, mailed on Feb. 18, 2025.

\* cited by examiner

PARAMETER DETERMINATION APPARATUS, PARAMETER DETERMINATION METHOD AND RECORDING MEDIUM

This application is a National Stage Entry of PCT/JP2019/045549 filed on Nov. 21, 2019, the contents of all of which are incorporated herein by reference, in their entirety.

TECHNICAL FIELD

The present disclosure relates to a technical field of a parameter determination apparatus, a parameter determination method and a recording medium that are configured to determine an image generation parameter that is used to generate an input image inputted to a recognition apparatus for recognize the input image.

BACKGROUND ART

A technique for automatically calculating (in other words, determining) a parameter for an image processing that is performed on an image is known (for example, see a Patent Literature 1). Moreover, a technique for effectively finding out a condition for accurately performing an information processing using an image is known (for example, see a Patent Literature 2). Additionally, there is a Patent Literature 3 as a background art document related to the present disclosure.

CITATION LIST

Patent Literature

Patent Literature 1: JP2012-198680A
Patent Literature 2: WO2014/002398A1
Patent Literature 3: JP2017-130794A

SUMMARY

Technical Problem

A recognition processing for recognizing an image is one example of an information processing using an image. For example, a face recognition apparatus that recognizes a face of a person included in an image and authenticates the person based on the recognized face is one example of the recognition processing. In this case, the image is inputted to a recognition apparatus, which recognizes the image, from an imaging apparatus such as a camera.

Here, the imaging apparatus that captures the image usually outputs the image that is easy to be viewable by a person (namely, easy to be viewed by an eye of the person). This is because such a usage that the person sees the image is general as a usage of the image captured by the imaging apparatus. Thus, a parameter that specifies an optical characteristic of the imaging apparatus and a parameter that specifies a detail of an image processing performed in the imaging apparatus are set to satisfy such a condition that the imaging apparatus outputs the image that is easy to be viewable by the person. On the other hand, the image that is easy to be viewable by the person is not always an image that is easy to be recognized by the recognition apparatus. This is because the recognition apparatus uses the image as digital data. Thus, there is a possibility that the recognition apparatus is not capable of properly recognizing the image when the recognition processing is performed by using the image outputted from the imaging apparatus as it is.

It is an example object of the present disclosure to provide a parameter determination apparatus, a parameter determination method and a recording medium that are configured to solve the above described technical problem. As one example, it is an example object of the present disclosure to provide a parameter determination apparatus, a parameter determination method and a recording medium that are configured to determine an image generation parameter used to generate an image that is a target for a recognition operation so that a recognition apparatus is capable of performing the recognition operation on an image that is easy to be recognized by the recognition apparatus.

Solution to Problem

One example aspect of a parameter determination apparatus includes: a calculation unit that is configured to calculate, based on a recognized result of a plurality of recognition target images by a recognition apparatus that performs a recognition operation on the recognition target image, an evaluation value for evaluating the recognized result; and a determination unit that is configured to determine, based on the evaluation value, an image generation parameter that is used to generate the recognition target image.

One example aspect of a parameter determination method includes: calculating, based on a recognized result of a plurality of recognition target images by a recognition apparatus that recognizes the recognition target image, an evaluation value for evaluating the recognized result; and determining, based on the evaluation value, an image generation parameter that is used to generate the recognition target image.

One example aspect of a recording medium is a recording medium on which a computer program that allows a computer to execute a parameter determination method is recorded, the parameter determination method includes: calculating, based on a recognized result of a plurality of recognition target images by a recognition apparatus that recognizes the recognition target image, an evaluation value for evaluating the recognized result; and determining, based on the evaluation value, an image generation parameter that is used to generate the recognition target image.

Effect

One example aspect of each of the parameter determination apparatus, the parameter determination method and the recording medium described above is capable of determining the image generation parameter used to generate the image that is the target for the recognition operation so that the recognition apparatus is capable of performing the recognition operation on the image that is easy to be recognized by the recognition apparatus.

DESCRIPTION OF EXAMPLE EMBODIMENTS

Next, an example embodiment of a parameter determination apparatus, a parameter determination method and a recording medium will be described with reference to the drawings. In the below described description, a recognition system SYS to which the example embodiment of the parameter determination apparatus, the parameter determination method and the recording medium is applied will be described by using.

(1) Recognition System SYS in First Example Embodiment

Figure 1:
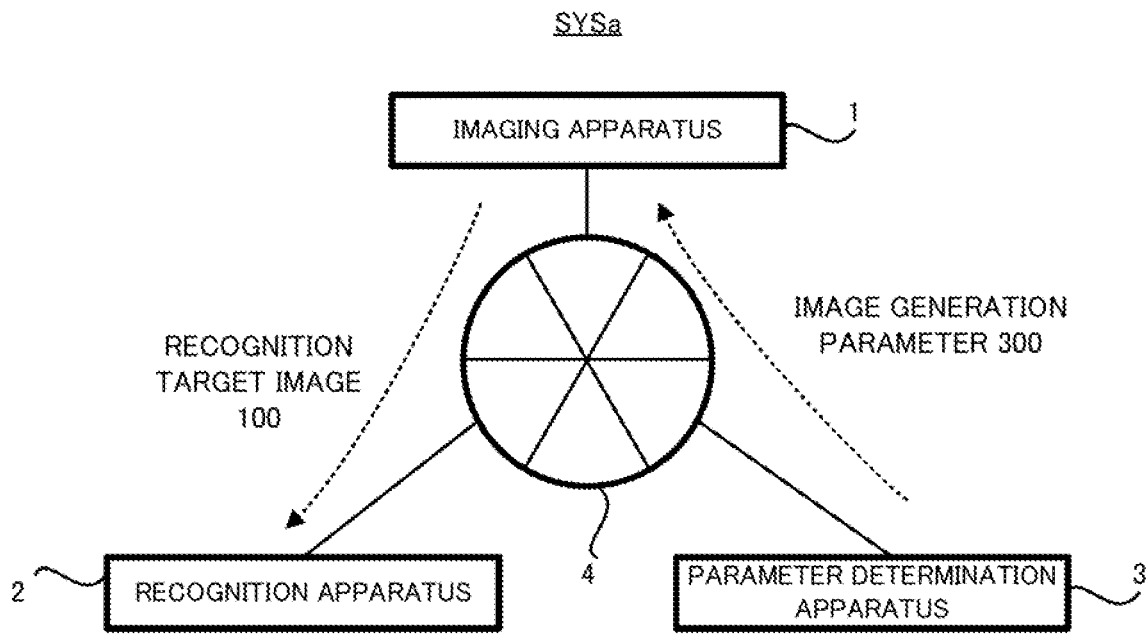
FIG. 1 is a block diagram that illustrates an entire configuration of a recognition system in a first example embodiment.

Firstly, the recognition system SYS in a first embodiment will be described. Hereinafter, the recognition system SYS in the first embodiment is referred to as a "recognition system SYSa".
(1-1) Configuration of Authentication System SYSa
(1-1-1) Entire Configuration of Authentication System SYSa Firstly, with reference to FIG. 1, an entire configuration of the recognition system SYSa in the first example embodiment will be described. FIG. 1 is a block diagram that illustrates the entire configuration of the recognition system SYSa in the first example embodiment.

As illustrated in FIG. 1, the recognition system SYSa includes an imaging apparatus 1, a recognition apparatus 2 and a parameter determination apparatus 3. The imaging apparatus 1, the recognition apparatus 2 and the parameter determination apparatus 3 are connected to communicate with one another through a communication network 4. The communication network 4 may include a wired network and may include a wireless network.

The imaging apparatus 1 is an imaging apparatus that is configured to capture an image of a person to generate a recognition target image 100 in which the person is included. The imaging apparatus 1 transmits (in other words, inputs) the generated recognition target image 100 to the recognition apparatus 2 through the communication network 4.

The recognition apparatus 2 obtains (in other words, receives) the recognition target image 100 generate by the imaging apparatus 1 through the communication network 4. The recognition apparatus 2 performs a recognition operation for recognizing a face of the person included in the recognition target image 100 based on the obtained recognition target image 100 and authenticating the person included in the recognition target image 100 by using the recognized face.

The parameter determination apparatus 3 performs a parameter determination operation for determining an image generation parameter 300 (specifically, determining a value of the image generation parameter 300). The image generation parameter 300 is used (in other words, referred) by the imaging apparatus 1 to generate the recognition target image 100. The image generation parameter 300 specifies a detail of an operation of the imaging apparatus 1 that generates the recognition target image 100. Therefore, the imaging apparatus 1 generates the recognition target image 100 based on the image generation parameter 300 generated by the parameter determination apparatus 3.
(1-1-2) Configuration of Imaging Apparatus 1

Figure 2:
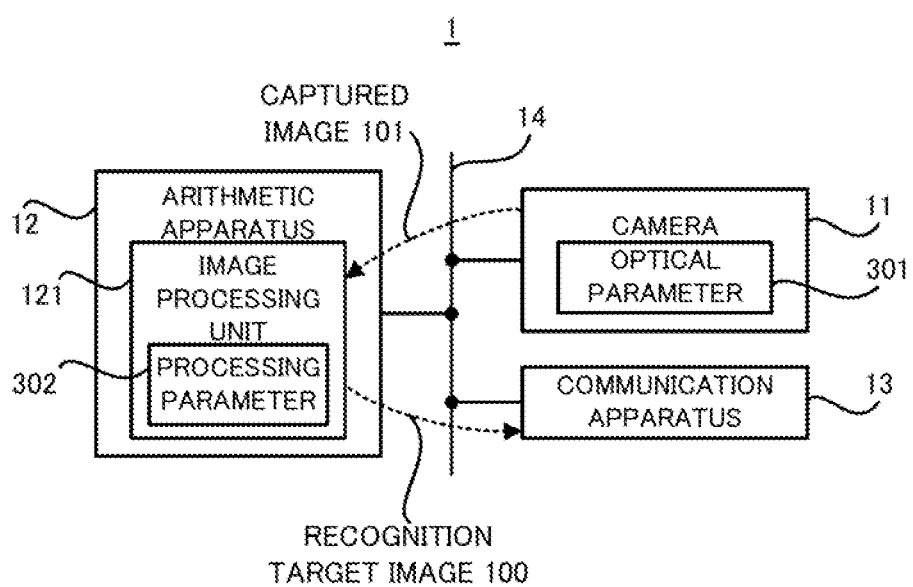
FIG. 2 is a block diagram that illustrates a configuration of an imaging apparatus in the first example embodiment.

Next, with reference to FIG. 2, a configuration of the imaging apparatus 1 will be described. FIG. 2 is a block diagram that illustrates the configuration of the imaging apparatus 1.

As illustrated in FIG. 2, the imaging apparatus 1 includes: a camera 11, an arithmetic apparatus 12 and a communication apparatus 13. The camera 11, the arithmetic apparatus 12 and the communication apparatus 13 are interconnected through a data bus 14.

The camera 11 generates a captured image 101 in which a person is included by capturing an image of the person. An optical characteristic of the camera 11 is specified by an optical parameter 301 that is one example of the image generation parameter 300. In this case, the camera 11 is a camera that has the optical characteristic specified by the optical parameter 301 that is set (in other words, applied, reflected or registered) in the camera 11. Therefore, a characteristic of the captured image 101 generated by the camera 11 is specified by the optical parameter 301. Namely, the camera 11 generates the captured image 101 based on the optical parameter 301. Note that at least one of an aperture value of the camera 11, a focus position (in other words, a point of fucus) of the camera 11, a shutter speed of the camera 11 and a sensitivity of the camera 11 is one example of the optical characteristic of the camera 11 specified by the optical parameter 301. Thus, the optical parameter 301 may include at least one of a parameter that specifies the aperture value of the camera 11, a parameter that specifies the focus position (in other words, the point of fucus) of the camera 11, a parameter that specifies the shutter speed of the camera 11 and a parameter that specifies the sensitivity of the camera 11.

The arithmetic apparatus 12 includes at least one of a CPU (Central Processing Unit) and GPU (Graphic Processing Unit), for example. The arithmetic apparatus 12 reads a computer program. For example, the arithmetic apparatus 12 may read a computer program stored in a not-illustrated storage apparatus of the imaging apparatus 1. For example, the arithmetic apparatus 12 may read a computer program stored in a computer-readable non-transitory recording medium, by using a not-illustrated recording medium reading apparatus. The arithmetic apparatus 12 may obtain (namely, download or read) a computer program from a not-illustrated apparatus placed outside the imaging apparatus 1 through the communication apparatus 13.

The arithmetic apparatus 12 executes the read computer program. As a result, an image processing unit 121 for performing an image processing on the captured image 101 is implemented in the arithmetic apparatus 12 as a logical functional block. Namely, the arithmetic apparatus 12 is configured to serve as a controller for implementing the image processing unit 121.

The image processing unit 121 generates a recognition target image 100 by performing a predetermined image processing on the captured image 101 generated by the camera 11. A detail of the image processing performed by the image processing unit 121 is specified by a processing parameter 302 that is one example of the image generation parameter 300. In this case, the image processing unit 121 generates the recognition target image 100 by performing the image processing, a detail of which is specified by the processing parameter 302, on the captured image 101. At least one of a white balance correction processing for correcting a white balance of the captured image 101, a brightness correction processing for correcting a brightness of the captured image 101, a contrast correction processing for correcting a contrast of the captured image 101, a dehaze processing for improving an image quality of the captured image 101 a visibility of which is deteriorated by an influence of a haze, a HDR (High Dynamic Range) processing for improving the image quality of the captured image 101 by adjusting a dynamic range of the captured image 101, a denoise processing for improving the image quality of the captured image 101 the visibility of which is deteriorated by a noise and a skeleton texture decomposition processing for diving the captured image 101 into a skeleton image and a texture image is one example of the image processing performed by the image processing unit 121. Thus, the processing parameter 302 may include at least one of a parameter that specifies a detail of the white balance correction processing, a parameter that specifies a detail of the brightness correction processing, a parameter that specifies a detail of the contrast correction processing, a parameter that specifies a detail of the dehaze processing, a parameter that specifies a detail of the HDR processing, a parameter that specifies a detail of the denoise processing and a parameter that specifies a detail of the skeleton texture decomposition processing. The parameter that specifies a detail of the white balance correction processing may include at least one of a parameter that specifies whether or not the white balance correction processing is performed, a parameter that specifies an intensity of the white balance correction processing, a parameter that specifies a limit value of a correction amount, a parameter that specifies a limit value of a correction amount of a G (Green) component relative to a R (Red) component and a parameter that specifies a limit value of a correction amount of a B (Blue) component relative to the R component, for example. The parameter that specifies a detail of the brightness correction processing may include at least one of a parameter that specifies whether or not the brightness correction processing is performed, a parameter that specifies an intensity of the brightness correction processing, a parameter that specifies a target value of the brightness and a parameter that specifies a limit value of a correction amount, for example. The parameter that specifies a detail of the contrast correction processing may include at least one of a parameter that specifies whether or not the contrast correction processing is performed, a parameter that specifies an intensity of the contrast correction processing, a parameter that specifies a limit value of a correction amount to a relatively dark area and a parameter that specifies a limit value of a correction amount to a relatively light area, for example. The parameter that specifies a detail of the dehaze processing may include at least one of a parameter that specifies whether or not the dehaze processing is performed, a parameter that specifies an intensity of the dehaze processing and a parameter that specifies a limit value of a correction amount of the captured image 101 by the dehaze processing, for example. The parameter that specifies a detail of the HDR processing may include at least one of a parameter that specifies whether or not the HDR processing is performed, a parameter that specifies an intensity of the HDR processing, a parameter that specifies a target value of the brightness by the HDR processing, a parameter that specifies a limit value of a correction amount of the captured image 101 by the HDR processing and a parameter that specifies a threshold value for identifying a black area, for example. The parameter that specifies a detail of the denoise processing may include at least one of a parameter that specifies whether or not the denoise processing is performed and a parameter that specifies an intensity of the denoise processing, for example. The parameter that specifies a detail of the skeleton texture decomposition processing may include at least one of a parameter that specifies whether or not the skeleton texture decomposition processing is performed and a parameter that specifies an intensity of the skeleton texture decomposition processing, for example.

The communication apparatus 13 is configured to communicate with the recognition apparatus 2 and the parameter determination apparatus 3 through the communication network 4. In the first example embodiment, the communication apparatus 13 is configured to transmit the recognition target image 100 to the recognition apparatus 2 through the communication network 4. Moreover, the communication apparatus 13 is configured to receive the image generation parameter 300 (specifically, the optical parameter 301 and the processing parameter 302) determined by the parameter determination apparatus 3 through the communication network 4. The optical parameter 301 received by the communication apparatus 13 is applied to the camera 11. Thus, the camera 11 is a camera that has the optical characteristic specified by the optical parameter 301 that is received by the communication apparatus 13. The processing parameter 302 received by the communication apparatus 13 is applied to the image processing unit 121. Thus, the image processing unit 121 performs, on the captured image 101, the image processing a detail of which is specified by the processing parameter 302 that is received by the communication apparatus 13.

(1-1-3) Configuration of Recognition Apparatus 2

Figure 3:
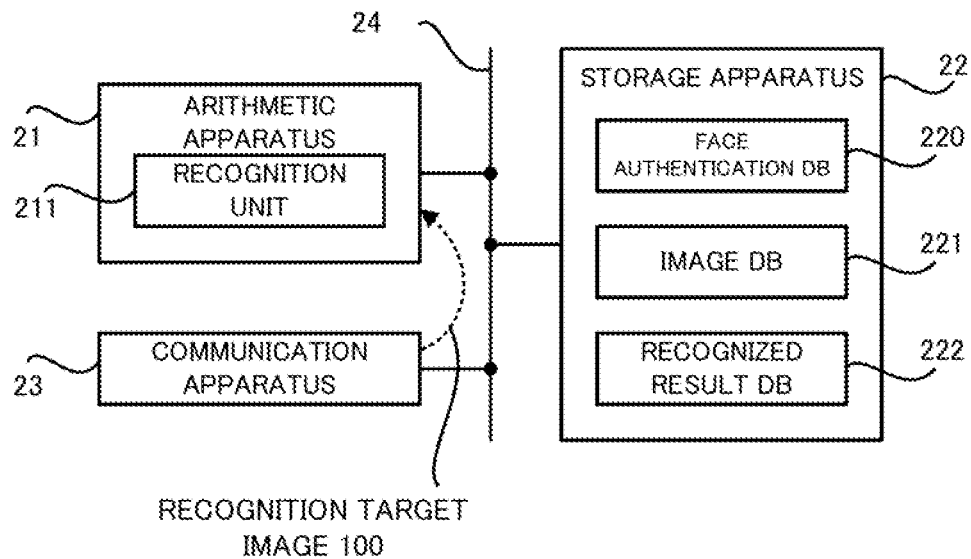
FIG. 3 is a block diagram that illustrates a configuration of a recognition apparatus in the first example embodiment.

Next, with reference to FIG. 3, a configuration of the recognition apparatus 2 will be described. FIG. 3 is a block diagram that illustrates the configuration of the recognition apparatus 2.

As illustrated in FIG. 3, the recognition apparatus 2 includes an arithmetic apparatus 21, a storage apparatus 22 and a communication apparatus 23. The arithmetic apparatus 21, the storage apparatus 22 and the communication apparatus 23 are interconnected through a data bus 24.

The arithmetic apparatus 21 includes at least one of a CPU and GPU, for example. The arithmetic apparatus 21 reads a computer program. For example, the arithmetic apparatus 21 may read a computer program stored in the storage apparatus 22. For example, the arithmetic apparatus 21 may read a computer program stored in a computer-readable non-transitory recording medium, by using a not-illustrated recording medium reading apparatus. The arithmetic apparatus 21 may obtain (namely, download or read) a computer program from a not-illustrated apparatus placed outside the recognition apparatus 2 through the communication apparatus 23. The arithmetic apparatus 21 executes the read computer program. As a result, a logical functional block for performing an operation (specifically, the above described recognition operation) that should be performed by the recognition apparatus 2 is implemented in the arithmetic apparatus 21. Namely, the arithmetic apparatus 21 is configured to serve as a controller for implementing the logical block for performing the recognition operation.

FIG. 3 illustrates one example of the logical functional block that is implemented in the arithmetic apparatus 21 for performing the recognition operation. As illustrated in FIG. 3, a recognition unit 211 is implemented in the arithmetic apparatus 21 as the logical functional block. The recognition unit 211 recognizes (specifically, detects) the face of the person included in the recognition target image 100 based on the recognition target image 100 transmitted from the imaging apparatus 1. Note that the recognition unit 211 may recognize (detect) the face of the person included in the recognition target image 100 by using an existing method of recognizing (detecting) a face of a person included in an image. Furthermore, the recognition unit 211 authenticates the person included in the recognition target image 100 by using the recognized face. The recognition unit 211 may authenticate the person included by using an existing method of authenticating a person based on a face of the person (namely, an existing face authentication method). Next, one example of the method of authenticating the person based on the face of the person will be described briefly. The recognition unit 211 searches, from a face authentication DB (DataBase) 220, a record satisfying a face authentication condition that is determined based on a feature amount of the authenticated face. The face authentication DB 220 includes a plurality of records in each of which a feature amount of a face of one person is associated with an identification information for uniquely identifying the one person. In this case, the recognition unit 211 searches the record satisfying the face authentication condition by comparing the feature amount of the authenticated face with the feature amount included in the face authentication DB 220. For example, the recognition unit 211 may search, from the face authentication DB 220, the record satisfying the face authentication condition that it includes the feature amount same as the feature amount of the authenticated face. When there is the record satisfying the face authentication condition in the face authentication DB 220, the recognition unit 211 authenticates that the person included in the recognition target image 100 is the person that is identified by the identification information included in the record satisfying the face authentication condition. When there is not the record satisfying the face authentication condition in the face authentication DB 220, the recognition unit 211 determines that the person included in the recognition target image 100 is a person that cannot be authenticated. Namely, the recognition unit 211 determines that the person included in the recognition target image 100 cannot be authenticated.

The storage apparatus 22 is configured to store desired data. For example, the storage apparatus 22 may temporarily store the computer program that is executed by the arithmetic apparatus 21. The storage apparatus 22 may temporarily store data temporarily used by the arithmetic apparatus 21 when the arithmetic apparatus 21 executes the computer program. The storage apparatus 22 may store data stored for a long term by the authentication apparatus 2. In the first example embodiment, the storage apparatus 22 is configured to store the above described face authentication DB 220. Furthermore, the storage apparatus 22 is configured to store an image DB (DataBase) 221 for accumulating (namely, storing, recording or containing) the recognition target image 100 transmitted from the imaging apparatus 1. Furthermore, the storage apparatus 22 is configured to store a recognized result DB 222 for accumulating a recognized result information that indicates a result of the recognition operation by the recognition unit 211 (for example, an information related to a recognized result of the person included in the recognition target image 100 and an information related to an authenticated result of the recognized person). Note that the storage apparatus 22 may include at least one of a RAM (Random Access Memory), a ROM (Read Only Memory), a hard disk apparatus, a magneto-optical disc, a SSD (Solid State Drive) and a disk array apparatus. Namely, the storage apparatus 22 may include a non-transitory recording medium.

The communication apparatus 23 is configured to communicate with the imaging apparatus 1 and the parameter determination apparatus 3 through the communication network 4. In the first example embodiment, the communication unit 23 is configured to obtain (namely, receive) the recognition target image 100 transmitted from the imaging apparatus 1 through the communication network 4. Furthermore, the communication unit 23 is configured to transmit the recognized result information accumulated in the recognized result DB 222 to the parameter determination apparatus 3 through the communication network 4. The parameter determination apparatus 3 determines the image generation parameter 300 based on the recognized result information.

(1-1-4) Configuration of Parameter Determination Apparatus 3

Figure 4:
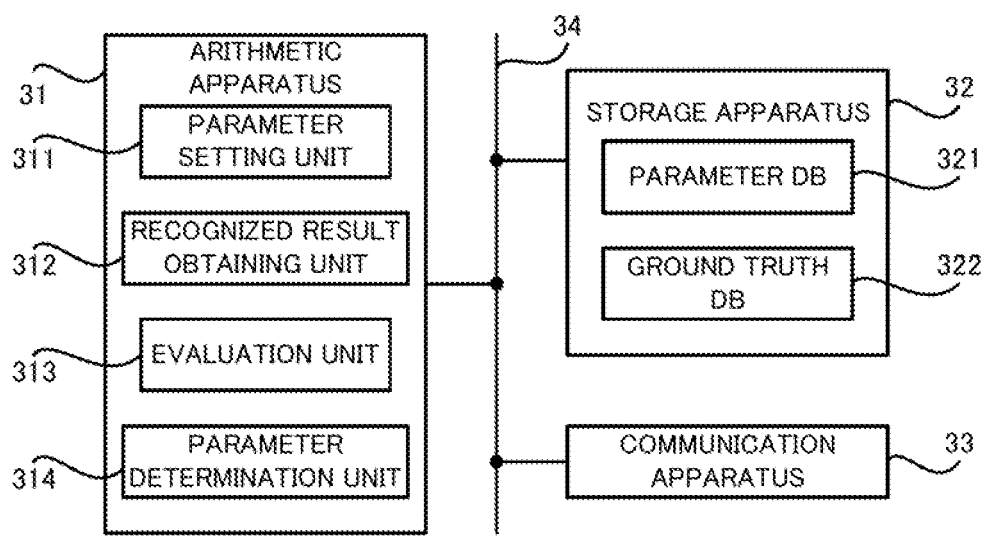
FIG. 4 is a block diagram that illustrates a configuration of a parameter determination apparatus in the first example embodiment.

Next, with reference to FIG. 4, a configuration of the parameter determination apparatus 3 will be described. FIG. 4 is a block diagram that illustrates the configuration of the parameter determination apparatus 3.

As illustrated in FIG. 4, the parameter determination apparatus 3 includes an arithmetic apparatus 31, a storage apparatus 32 and a communication apparatus 33. The arithmetic apparatus 31, the storage apparatus 32 and the communication apparatus 33 are interconnected through a data bus 34.

The arithmetic apparatus 31 includes at least one of a CPU and GPU, for example. The arithmetic apparatus 31 reads a computer program. For example, the arithmetic apparatus 31 may read a computer program stored in the storage apparatus 32. For example, the arithmetic apparatus 31 may read a computer program stored in a computer-readable non-transitory recording medium, by using a not-illustrated recording medium reading apparatus. The arithmetic apparatus 31 may obtain (namely, download or read) a computer program from a not-illustrated apparatus placed outside the parameter determination apparatus 3 through the communication apparatus 23. The arithmetic apparatus 31 executes the read computer program. As a result, a logical functional block for performing an operation (specifically, the above described parameter determination operation) that should be performed by the parameter determination apparatus 3 is implemented in the arithmetic apparatus 31. Namely, the arithmetic apparatus 31 is configured to serve as a controller for implementing the logical block for performing the parameter determination operation.

FIG. 4 illustrates one example of the logical functional block that is implemented in the arithmetic apparatus 31 for performing the parameter determination operation. As illustrated in FIG. 4, a parameter setting unit 311, a recognized result obtaining unit 312, an evaluation unit 313 and a parameter determination unit 314 are implemented in the arithmetic apparatus 31 as the logical functional blocks. Incidentally, a detail of an operation of each of the parameter setting unit 311, the recognized result obtaining unit 312, the evaluation unit 313 and the parameter determination unit 314 will be described in detail later by using FIG. 5 and so on, however, an overview thereof will be described briefly here. The parameter setting unit 311 set the image generation parameter 300 of the imaging apparatus 1 by transmitting the image generation parameter 300 that should be set to the imaging apparatus 1. The imaging apparatus 1 generates the recognition target image 100 by using the image generation parameter 300 set by the parameter setting unit 311. The recognized result obtaining unit 312 obtains the recognized result information indicating the result of the recognition operation (namely, the recognized result information accumulated in the recognized result DB 222 in the storage apparatus 22) from the recognition apparatus 2. The evaluation unit 313 generates, based on the recognized result information, an evaluation value for evaluating whether or not the image generation parameter 300 that is used by the imaging apparatus 1 to generate the recognition target image 100 (namely, the image generation parameter 300 that is actually set to the imaging apparatus 1) is proper. The parameter determination unit 314 determines (in other words, calculates) a value of the image generation parameter 300 that should be set to the imaging apparatus 1 based on the evaluation value calculated by the evaluation unit 313.

The storage apparatus 32 is configured to store desired data. For example, the storage apparatus 32 may temporarily store the computer program that is executed by the arithmetic apparatus 31. The storage apparatus 32 may temporarily store data temporarily used by the arithmetic apparatus 31 when the arithmetic apparatus 31 executes the computer program. The storage apparatus 32 may store data stored for a long term by the parameter determination apparatus 3. In the first example embodiment, the storage apparatus 32 is configured to store a parameter DB 321 for accumulating (namely, storing, recording or containing) an information related to the image generation parameter 300 determined by the parameter determination apparatus 3. Furthermore, the storage apparatus 32 is configured to store a ground truth DB 322 for accumulating ground truth data that is compared with the recognized result information for calculating the above described evaluation value (for example, a F-measure described below). Note that the storage apparatus 32 may include at least one of a RAM (Random Access Memory), a ROM (Read Only Memory), a hard disk apparatus, a magneto-optical disc, a SSD (Solid State Drive) and a disk array apparatus. Namely, the storage apparatus 32 may include a non-transitory recording medium.

The communication apparatus 33 is configured to communicate with the imaging apparatus 1 and the recognition apparatus 2 through the communication network 4. In the first example embodiment, the communication apparatus 33 is configured to obtain (namely, receive) the recognized result information transmitted from the recognition apparatus 2 through the communication network 4. Furthermore, the communication unit 23 is configured to transmit, to the imaging apparatus, the image generation parameter 300 that should be set to the imaging apparatus 1 through the communication network 4 under the control of the parameter setting unit 311. The image generation parameter 300 transmitted by the communication unit 33 is applied to the imaging apparatus 1. Namely, the imaging apparatus 1 generates the recognition target image 100 by using the image generation parameter 300 transmitted by the communication unit 33.

(1-2) Operation of Recognition System SYSa

Figure 5:
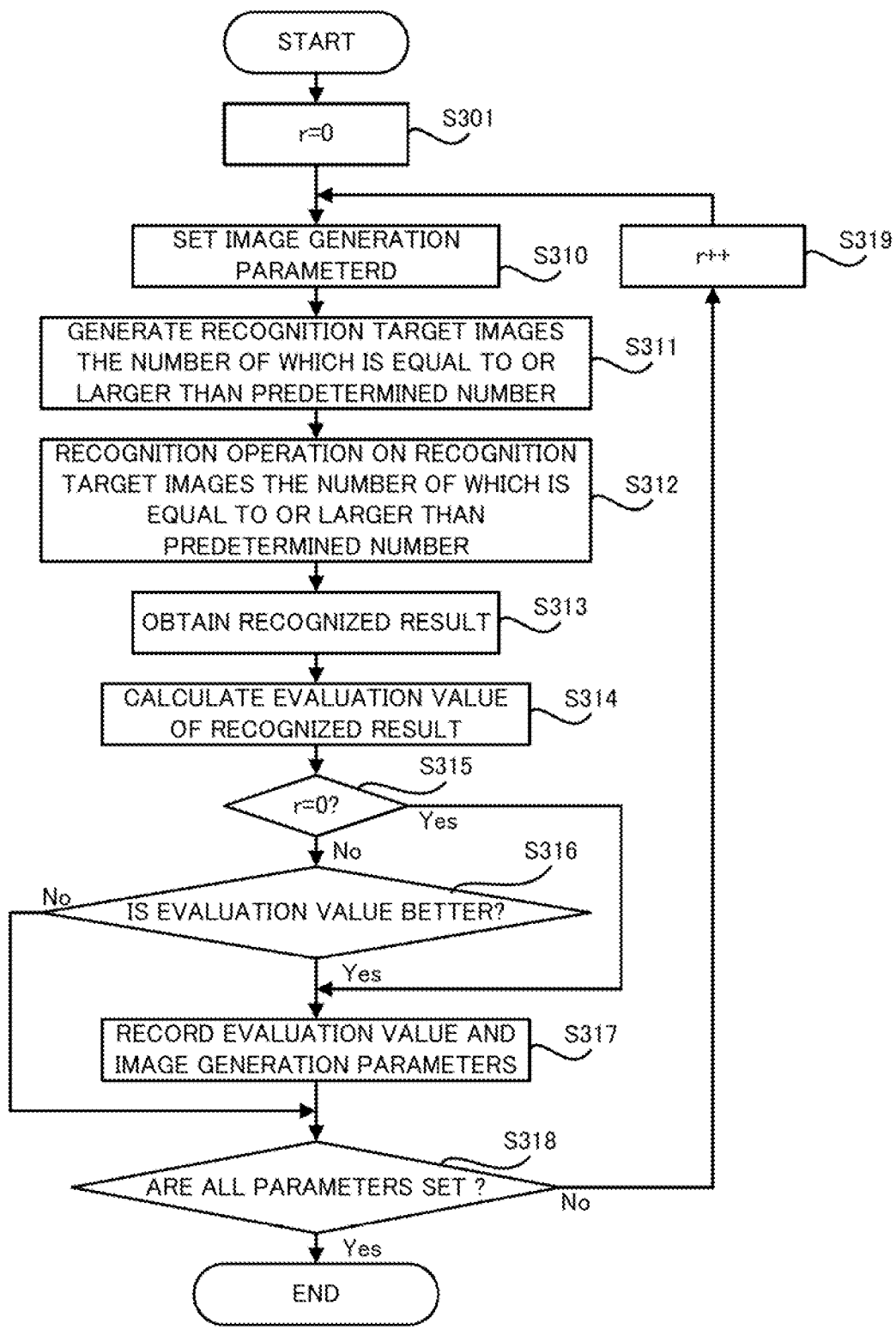
FIG. 5 is a flow chart that illustrates a flow of a parameter determination operation that is performed by parameter determination apparatus in the first example embodiment.

Next, with reference to FIG. 5, an operation of the recognition system SYS in the first example embodiment will be described. Especially, in the below described description, the parameter determination operation that is performed by the parameter determination apparatus 3 will be described. FIG. 5 is s flowchart that illustrates a flow of the parameter determination operation that is performed by the parameter determination apparatus 3.

As illustrated in FIG. 5, firstly, the parameter setting unit 311 initializes a variable number r to be zero (a step S301). Then, the parameter setting unit 311 sets the image generation parameters 300 of the imaging apparatus 1 (specifically, the optical parameter 301 of the camera 11 and the processing parameter 302 of the image processing unit 121) to be initial values (a step S310). Note that either one of a plurality of candidate values for the image generation parameter 300 that should be set to the imaging apparatus 1 in the parameter determination operation may be used as the initial value of the image generation parameter 300. The plurality of candidate values may include a recommended value that is set to the imaging apparatus 1 in advance.

Then, the parameter determination unit 314 controls the imaging apparatus 1 to generate the recognition target images 100, the number of which is equal to or larger than a predetermine number, based on the image generation parameters 300 set at the step S310 (a step S311). Namely, the parameter determination unit 314 controls the camera 11, which has the optical characteristic that is specified by the optical parameter 301 set at the step S310, to capture (namely, generate) the captured images 101 the number of which is equal to or larger than the predetermined number. Furthermore, the parameter determination unit 314 controls the image processing unit 121 to generate the recognition target images 100 the number of which is equal to or larger than the predetermine number by performing the image processing, the detail of which is specified by the processing parameter 302 set at the step S310, on the captured images 101 the number of which is equal to or larger than the predetermined number. The recognition apparatus 2 obtains the recognition target images 100 generated by the imaging apparatus 1 by using the communication apparatus 23 and accumulates them in the image DB 221 of the storage apparatus 22.

Incidentally, in the parameter determination operation, the camera 11 may capture the image of the person in a situation where the person is actually located in front of the camera 11. Alternatively, the camera 11 may capture an image or an image of a model in a situation where the image or the model that imitates the person is located in front of the camera 11. Furthermore, an information related to the person captured by the camera 11 (alternatively, the person that is imitated by the image or the model captured by the camera 11) is accumulated as the ground truth data in the ground truth DB 322. Namely, in the ground truth DB 322, the ground truth data indicating the person included in each recognition target image 100 transmitted from the imaging apparatus 1 to the recognition apparatus 2 (for example, the identification information for uniquely identifying the person), the number of which is equal to the number of the recognition target image 100 used by the parameter determination operation, are accumulated.

After the recognition target image 100 the number of which is equal to or larger than the predetermined number are generated, the parameter determination unit 314 controls the recognition apparatus 2 (especially, the recognition unit 211) to perform the above described recognition operation on each of the recognition target images 100 the number of which is equal to or larger than the predetermined number generated at the step S311 (a step S312). The recognition apparatus 2 accumulates the recognized result information indicating the result of the recognition operation in the recognized result DB 222 of the storage apparatus 22.

After the recognition operation on the recognition target images 100 the number of which is equal to or larger than the predetermined number is completed, the recognized result obtaining unit 312 obtains the recognized result information indicating the result of the recognition operation at the step S312 from the recognition apparatus 2 through the communication apparatus 33 (a step S313).

Then, the evaluation unit 313 calculates the evaluation value for evaluating whether or not the image generation parameters 300 that are actually set to the imaging apparatus 1 at the step S310 is proper based on the recognized result information obtained at the step S313 and the ground truth data stored in the ground truth DB 322 (a step S314). Namely, the evaluation unit 313 calculates the evaluation value for evaluating the recognition operation that is performed on the recognition target image 100 generated based on the image generation parameters 300 set at the step S310.

For example, the evaluation unit 313 may calculate the F-measure as the evaluation value. The F-measure is an evaluation value that is determined based on a precision and a recall. Specifically, the F-measure is an evaluation value that is defined by an equation "F-measure=(2×precision×recall)/(precision+recall)". The precision indicates a ratio of the number of the recognition target image 100 in which the authentication of the person succeeds relative to the number of the recognition target images 100 from which the face of the person is detected. The recall indicates a ratio of the number of the recognition target image 100 in which the authentication of the person succeeds relative to the number of the recognition target images 100 in which the person is included (namely, a total number of the recognition target images 100 in which the person should be authenticated, and a total number of the ground truth data corresponding to the recognition target images 100).

"The recognition target image 100 in which the authentication of the person succeeds" in the present example embodiment means "the recognition target image 100 that allows the recognition unit 211 to correctly authenticate the person included in the recognition target image 100 to be that person himself". Namely, "the recognition target image 100 that makes the recognition unit 211 authenticate the person included in the recognition target image 100 to be another person (namely, the recognition target image 100 that is incorrectly authenticated by the recognition unit 211)" is not included in "the recognition target image 100 in which the authentication of the person succeeds". Specifically, when the recognized result information related to one recognition target image 100 including one person indicates such an authenticated result that "the person included in the one recognition target image 100 is authenticated to be the one person", the one recognition target image 100 is included in "the recognition target image 100 in which the authentication of the person succeeds". On the other hand, when the recognized result information related to one recognition target image 100 including one person indicates such an authenticated result that "the person included in the one recognition target image 100 is authenticated to be another person that is different from the one person", the one recognition target image 100 is not included in "the recognition target image 100 in which the authentication of the person succeeds". Thus, the ground truth DB 322 that is used to calculate the evaluation value accumulates the ground truth data indicating that the person included in the one recognition target image 100 is the one person. In this case, the evaluation unit 313 is capable of calculating "the number of the recognition target image 100 in which the authentication of the person succeeds" by using an evaluated result information and the ground truth DB 322, and as a result, is capable of correctly calculating the F-measure (namely, the evaluation value).

Alternatively, the evaluation unit 313 may calculate, as the evaluation value, a value that is different from the F-measure. For example, the evaluation unit 313 may calculate the above described precision itself as the evaluation value. For example, the evaluation unit 313 may calculate the above described recall itself as the evaluation value. For example, the evaluation unit 313 may calculate the evaluation value determined based on the above described precision. For example, the evaluation unit 313 may calculate the evaluation value determined based on the above described recall. The ground truth DB 322 may not be used depending on the calculated evaluation value. In this case, the storage apparatus 32 may not store the ground truth DB 322.

Then, the parameter determination unit 314 determines whether or not the variable number r is zero (a step S315).

As a result of the determination at the step S315, when it is determined that the variable number r is zero (the step S315: Yes), the parameter determination unit 314 records, in the parameter DB 321, the information related to the image generation parameters 300 set at the step S310 (a step S317). The information related to the image generation parameters 300 may include an information indicating the value of the image generation parameters 300 set at the step S310 and an information indicating the evaluation value calculated at the step S314, for example.

The information related to the image generation parameters 300 recorded in the parameter DB 321 corresponds to the information related to the image generation parameters 300 that should be used by the imaging apparatus 1 to generate the recognition target image 100 (namely, the image generation parameters 300 that should be set to the imaging apparatus 1). Thus, after the parameter determination operation illustrated in FIG. 5 is completed, the values of the image generation parameters 300 recorded in the parameter DB 321 are actually set to the imaging apparatus 1. Namely, after the parameter determination operation illustrated in FIG. 5 is completed, the imaging apparatus 1 generates the recognition target image 100 based on the image generation parameters 300 recorded in the parameter DB 321.

Then, the parameter setting unit 311 determines whether or not all candidate values for the image generation parameter 300 that should be set to the imaging apparatus 1 in the parameter determination operation is actually set to the imaging apparatus 1 (a step S318). For example, in a situation where a first candidate value to a fifth candidate value should be set to the imaging apparatus 1 as the image generation parameters 300 in the parameter determination operation, the parameter setting unit 311 determines whether or not each of the first candidate value to the fifth candidate value is actually set to the imaging apparatus 1 as the image generation parameter 300. When at least one of the first candidate value to the fifth candidate value is not yet set to the imaging apparatus 1 as the image generation parameter 300, the parameter setting unit 311 determines that all of the candidate values for the image generation parameters 300 that should be set to the imaging apparatus 1 in the parameter determination operation are not actually set to the imaging apparatus 1.

As a result of the determination at the step S318, when it is determined that all candidate values for the image generation parameters 300 that should be set to the imaging apparatus 1 in the parameter determination operation are not yet set to the imaging apparatus 1 (the step S318: No), the parameter setting unit 311 increments the variable number r by one (a step S319), and set the image generation parameter 300 having new value (namely, new candidate value for the image generation parameter 300) to the imaging apparatus 1 (the step S310). Then, the processes of the step S311 and after the step S311 are repeated.

On the other hand, as a result of the determination at the step S318, when it is determined that all candidate values for the image generation parameters 300 that should be set to the imaging apparatus 1 in the parameter determination operation are already set to the imaging apparatus 1 (the step S318: Yes), the parameter determination apparatus 3 ends the parameter determination operation illustrated in FIG. 5.

On the other hand, as a result of the determination at the step S315, when it is determined that the variable number r is not zero (the step S315: No), the information related to the image generation parameters 300 is already recorded in the parameter DB 321. In this case, the parameter determination unit 314 determines whether or not the evaluation value that is newly calculated at the step S314 is better than the evaluation value that is recorded in the parameter DB 321 with it to be associated with the information indicating the image generation parameters 300 (a step S316). Namely, the parameter determination unit 314 determines whether or not the evaluation value corresponding to the image generation parameters 300 that are newly set at the step S301 is better than the evaluation value corresponding to the image generation parameters 300 that is recorded in the parameter DB 321.

Note that the evaluation value is an index value that is better as the recognition operation is better (for example, a recognition accuracy of the face of the person is better and/or an authentication accuracy of the person is better). Therefore, at the step S316, it can be said that the parameter determination unit 314 determines whether or not a result of the recognition operation using the recognition target image 100 generated based on the image generation parameters 300 that are newly set at the step S301 is better than a result of the recognition operation using the recognition target image 100 generated based on the image generation parameters 300 that are recorded in the parameter DB 321. For example, it can be said that the parameter determination unit 314 determines whether or not the recognition accuracy of the face of the person using the recognition target image 100 generated based on the image generation parameters 300 that are newly set at the step S301 is better than the recognition accuracy of the face of the person using the recognition target image 100 generated based on the image generation parameters 300 that are recorded in the parameter DB 321. For example, it can be said that the parameter determination unit 314 determines whether or not the authentication accuracy of the person using the recognition target image 100 generated based on the image generation parameters 300 that are newly set at the step S301 is better than the authentication accuracy of the person using the recognition target image 100 generated based on the image generation parameters 300 that are recorded in the parameter DB 321.

As a result of the determination at the step S316, when it is determined that the evaluation value is better (the step S316: Yes), it is estimated that the result of the recognition operation using the recognition target image 100 generated based on the image generation parameters 300 that are newly set at the step S310 is better than the result of the recognition operation using the recognition target image 100 generated based on the image generation parameters 300 that are recorded in the parameter DB 321. For example, it is estimated that the recognition accuracy of the face of the person using the recognition target image 100 generated based on the image generation parameters 300 that are newly set at the step S310 is better than the recognition accuracy of the face of the person using the recognition target image 100 generated based on the image generation parameters 300 that are recorded in the parameter DB 321. For example, it is estimated that the authentication accuracy of the person using the recognition target image 100 generated based on the image generation parameters 300 that are newly set at the step S310 is better than the authentication accuracy of the person using the recognition target image 100 generated based on the image generation parameters 300 that are recorded in the parameter DB 321. Thus, it is estimated that the image generation parameters 300 that are newly set at the step S310 is more suitable for the purpose of performing the proper recognition operation (for example, the recognition operation having higher accuracy) than the image generation parameters 300 that are recorded in the parameter DB 321. In this case, the parameter determination unit 314 newly records, in the parameter DB 321, the information related to the image generation parameters 300 that are newly set at the step S310 (the step S317). Namely, the parameter determination unit 314 rewrites (namely, updates) the information related to the image generation parameters 300 that are recorded in the parameter DB 321 by the information related to the image generation parameters 300 that are newly set at the step S310.

On the other hand, as a result of the determination at the step S316, when it is determined that the evaluation value is not better (the step S316: No), it is estimated that the result of the recognition operation using the recognition target image 100 generated based on the image generation parameters 300 that are recorded in the parameter DB 321 is better than the result of the recognition operation using the recognition target image 100 generated based on the image generation parameters 300 that are newly set at the step S310. For example, it is estimated that the recognition accuracy of the face of the person using the recognition target image 100 generated based on the image generation parameters 300 that are recorded in the parameter DB 321 is better than the recognition accuracy of the face of the person using the recognition target image 100 generated based on the image generation parameters 300 that are newly set at the step S310. For example, it is estimated that the authentication accuracy of the person using the recognition target image 100 generated based on the image generation parameters 300 that are recorded in the parameter DB 321 is better than the authentication accuracy of the person using the recognition target image 100 generated based on the image generation parameters 300 that are newly set at the step S310. Thus, it is estimated that the image generation parameters 300 that are recorded in the parameter DB 321 is more suitable for the purpose of performing the proper recognition operation (for example, the recognition operation having higher accuracy) than the image generation parameters 300 that are newly set at the step S310. In this case, the parameter determination unit 314 does not newly record, in the parameter DB 321, the information related to the image generation parameters 300 that are newly set at the step S310. Namely, the information related to the image generation parameters 300 that are recorded in the parameter DB 321 is kept being recorded in the parameter DB 321 as it is.

(1-3) Technical Effect of Recognition System SYSa

As described above, the recognition system SYSa (especially, the parameter determination apparatus 3) in the first example embodiment is capable of determining the image generation parameter 300 by using the recognized result information indicating the recognized result of the recognition operation. Namely, the parameter determination apparatus 3 is capable of determining the value of the image generation parameter 300 that should be set to the imaging apparatus 1. Thus, the parameter determination apparatus 3 is capable of determining the value of the image generation parameter 300 that realizes the proper recognition operation (for example, the recognition operation having higher recognition accuracy and/or authentication accuracy). Namely, the parameter determination apparatus 3 is capable of determining the value of the image generation parameter 300 by which the recognition target image 100 that is easy to be recognized by the recognition apparatus 2 is generable. The parameter determination apparatus 3 is capable of determining the value of the image generation parameter 300 that is used to generate the recognition target image 100 so that the recognition apparatus 2 performs the recognition operation by using the recognition target image 100 that is easy to be recognized by the recognition apparatus 2. Thus, when the parameter determination operation is performed, the imaging apparatus 1 is capable of generating the recognition target image 100 that is easier to be recognized by the recognition apparatus 2, compared to the case where the parameter determination operation is not performed. Furthermore, when the parameter determination operation is performed, the recognition apparatus 2 is capable of performing the more proper recognition operation by using the recognition target image 100 that is easier to be recognized by the recognition apparatus 2, compared to the case where the parameter determination operation is not performed.

Note that the parameter determination apparatus 3 may perform the parameter determination operation before an operation of the authentication system SYSa starts. Alternatively, the parameter determination apparatus 3 may perform the parameter determination operation after the operation of the authentication system SYSa starts.

Moreover, as described above, the image generation parameters 300 includes a plurality of types of parameters. In this case, the parameter determination apparatus 3 may determine the plurality of types of parameters in sequence. For example, the parameter determination apparatus 3 may determine a first type of parameter (for example, the parameter that specifies the aperture value of the camera 11), and then, may determine a second type of parameter (for example, the parameter that specifies the detail of the white balance correction processing).

Moreover, the parameter determination apparatus 3 may determine the processing parameter 302 of the image processing unit 121 after determining the optical parameter 301 of the camera 11. This is because the image processing unit 121 performs the image processing on the captured image 101 captured by the camera 11, and thus, there is a possibility that the value of the processing parameter 302 is needed to be changed when the value of the optical parameter 301 is changed. Thus, when the processing parameter 302 is determined after the optical parameter 301 is determined, the parameter determination apparatus 3 is capable of determining the processing parameter 302 in a situation where the value of the optical parameter 301 is fixed. Thus, the parameter determination apparatus 3 is capable of determining the image generation parameter 300 relatively effectively.

(2) Recognition System SYS in Second Example Embodiment

Next, the recognition system SYS in a second example embodiment will be described. Hereinafter, the recognition system SYS in the second example embodiment is referred to as a "recognition system SYSb".

(2-1) Configuration of Recognition System SYSb

Figure 6:
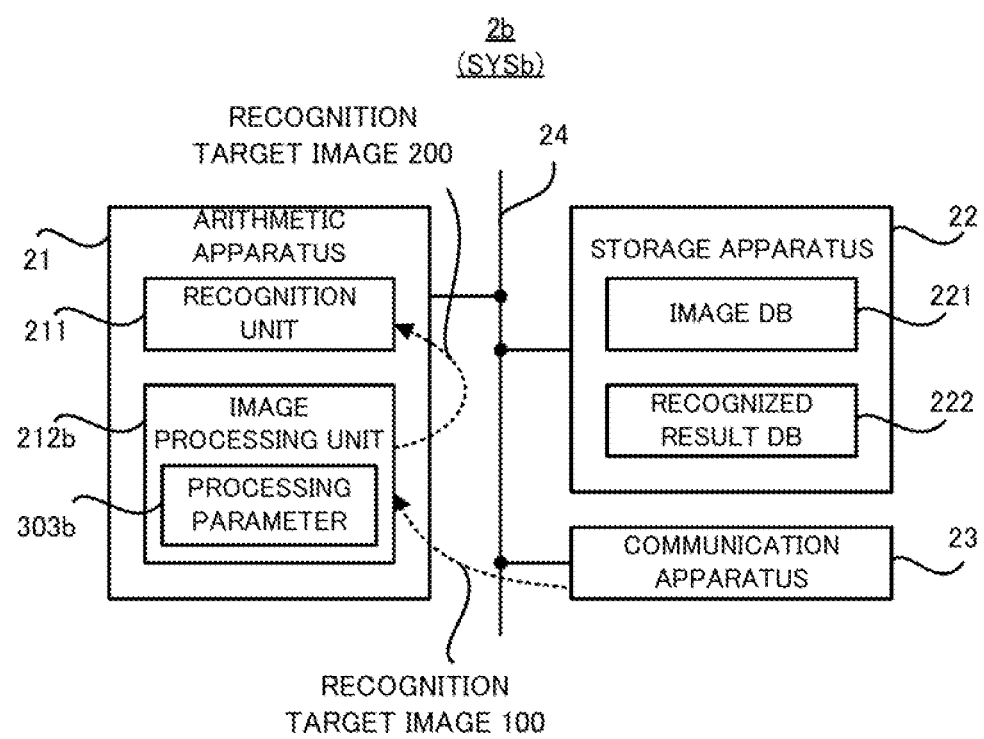
FIG. 6 is a block diagram that illustrates a configuration of a recognition apparatus in a second example embodiment.

Firstly, a configuration of the recognition system SYSb in a second example embodiment will be described. The system SYSb in the second example embodiment is different from the recognition system SYSa in the first example embodiment in that it includes a recognition apparatus 2*b* instead of the recognition apparatus 2. Another feature of the recognition system SYSb may be same as another feature of the recognition system SYSa. Thus, in the below described description, with reference to FIG. 6, a configuration of the recognition apparatus 2*b* in the second example embodiment will be described. FIG. 6 is a block diagram that illustrates the configuration of the recognition apparatus 2*b* in the second example embodiment. Note that a detailed description of the component that is already described is omitted by assigning the same reference number thereto. Moreover, a detailed description of the operation that is already described is omitted by assigning the same step number thereto.

As illustrated in FIG. 6, the recognition apparatus 2*b* is different from the above described recognition apparatus 2 in that an image processing unit 212*b* is implemented in the arithmetic apparatus 21. Another feature of the recognition apparatus 2*b* may be same as another feature of the recognition apparatus 2.

The image processing unit 212*b* generates a recognition target image 200 by performing a predetermined image processing on the recognition target image 100 obtained from the imaging apparatus 1. The recognition target image 200 is used for the recognition operation by the recognition unit 211. Namely, in the second example embodiment, the recognition unit 211 performs the recognition operation by using the recognition target image 200 instead of the recognition target image 100. Namely, the recognition unit 211 recognizes the face of the person included in the recognition target image 200 and authenticates the person included in the recognition target image 200 based on the recognized face.

A detail of the image processing performed by the image processing unit 212*b* is specified by a processing parameter 303*b* that is one example of the image generation parameter 300. In this case, the image processing unit 212*b* generates the recognition target image 200 by performing the image processing, a detail of which is specified by the processing parameter 303*b*, on the recognition image 100. The image processing unit 212*b* may perform the image processing a type of which is same as that of the image processing performed by the image processing unit 121 of the above described imaging apparatus 1. For example, the image processing unit 212*b* may perform at least one of the white balance correction processing, the brightness correction processing, the contrast correction processing, the dehaze processing, the HDR processing, the denoise processing and the skeleton texture decomposition processing. In this case, the processing parameter 303*b* may include at least one of a parameter that specifies a detail of the white balance correction processing, a parameter that specifies a detail of the brightness correction processing, a parameter that specifies a detail of the contrast correction processing, a parameter that specifies a detail of the dehaze processing, a parameter that specifies a detail of the HDR processing, a parameter that specifies a detail of the denoise processing and a parameter that specifies a detail of the skeleton texture decomposition processing, as with the above described processing parameter 302. Alternatively, the image processing unit 212b may perform the image processing the type of which is different from that of the image processing performed by the image processing unit 121 of the above described imaging apparatus 1.

(2-2) Operation of Recognition System SYSb

Figure 7:
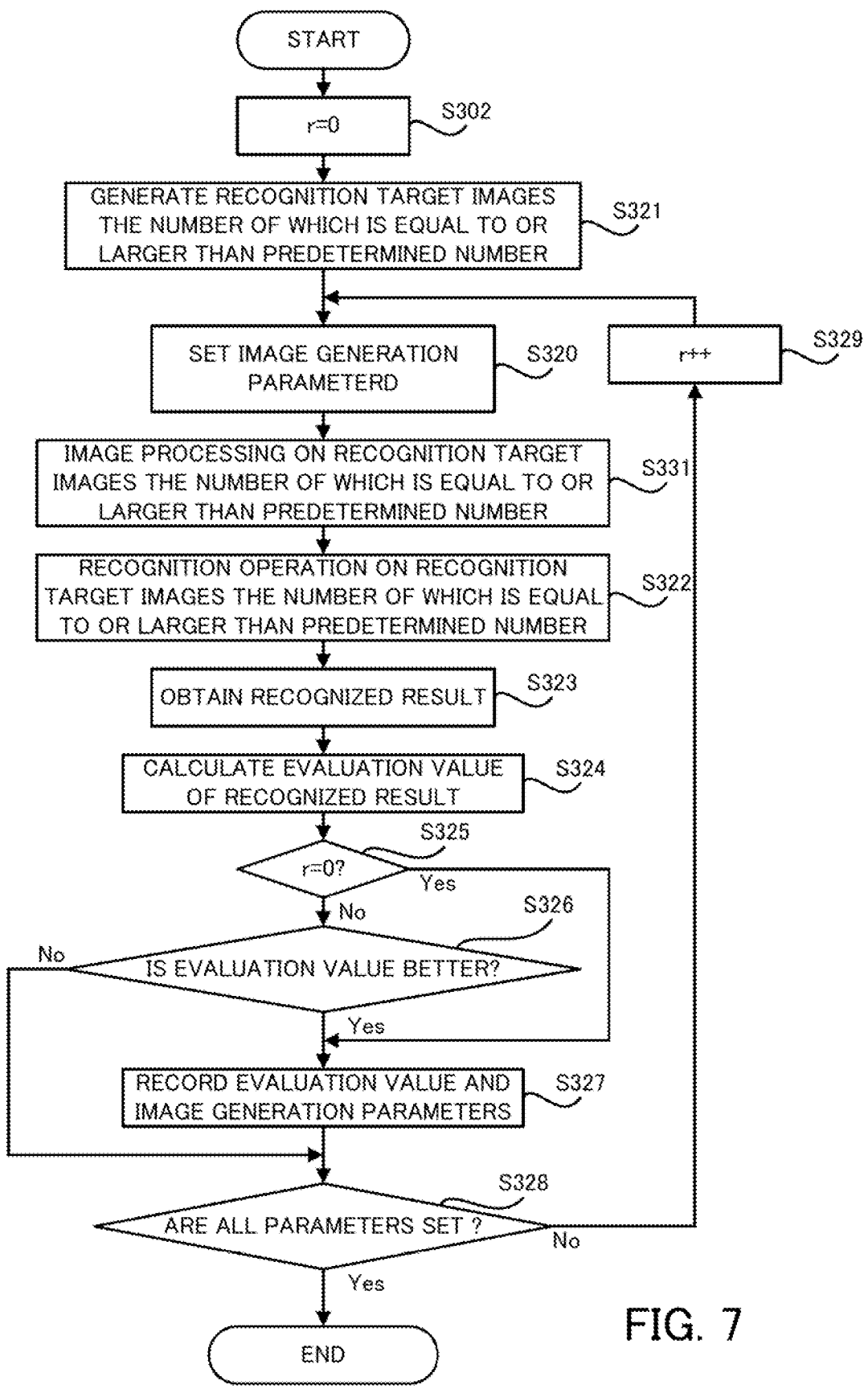
FIG. 7 is a flow chart that illustrates a flow of a parameter determination operation that is performed by parameter determination apparatus in the second example embodiment.

Next, an operation of the recognition system SYSb in the second example embodiment will be described. Especially, in the below described description, a parameter determination operation that is performed by the parameter determination apparatus 3 will be described. In the second example embodiment, not only the parameter related to the imaging apparatus 1 (specifically, the optical parameter 301 and the processing parameter 302) described in the first example embodiment but also the parameter related to the recognition apparatus 2b (specifically, the processing parameter 303b) are used as the image generation parameters 300. Thus, the parameter determination apparatus 3 determines the processing parameter 303b related to the recognition apparatus 2b in addition to or instead of determining the optical parameter 301 and the processing parameter 302 related to the imaging apparatus 1 by performing the above described determination operation in the first example embodiment. Therefore, in the below described description, with reference to FIG. 7, the parameter determination operation for determining the processing parameter 303b related to the recognition apparatus 2b will be described. FIG. 7 is s flowchart that illustrates a flow of the parameter determination operation for determining the processing parameter 303b related to the recognition apparatus 2b. Note that the image generation parameter 300 means the processing parameter 303b in the below described description, when there is no special notation.

As illustrated in FIG. 7, the parameter setting unit 311 initializes a variable number r to be zero (a step S302). Then, the parameter determination unit 314 controls the imaging apparatus 1 to generate the recognition target images 100, the number of which is equal to or larger than a predetermine number (a step S321). Note that the process at the step S321 may be same as the process at the step S311. However, in the step S321, when the optical parameter 301 and the processing parameter 302 are already determined, the parameter determination unit 314 may control the imaging apparatus 1 to generate the recognition target images 100, the number of which is equal to or larger than the predetermine number, based on the optical parameter 301 and the processing parameter 302 that are already determined. Alternatively, when the optical parameter 301 and the processing parameter 302 are not yet determined, the parameter determination unit 314 may control the imaging apparatus 1 to generate the recognition target images 100, the number of which is equal to or larger than the predetermine number, based on the default optical parameter 301 and processing parameter 302.

After the recognition target image 100 the number of which is equal to or larger than the predetermined number are generated, the parameter setting unit 311 sets the image generation parameter 300 of the recognition apparatus 2 (specifically, the processing parameter 302 of the image processing unit 212b) to be initial values (a step S320). Note that either one of a plurality of candidate values for the image generation parameter 300 that should be set to the recognition apparatus 2 in the parameter determination operation may be used as the initial value of the image generation parameter 300. The plurality of candidate values may include a recommended value that is set to the recognition apparatus 2 in advance.

Then, the parameter determination unit 314 controls the image processing unit 212b of the recognition apparatus 2b to perform the image processing, the detail of which is specified by the image generation parameter 300 set at the step S320, on each of the recognition target images 100, the number of which is equal to or larger than the predetermined number, generated at the step S321 (a step S331). As a rust, image processing unit 212b generates the recognition target images 200 the number of which is equal to or larger than the predetermined number.

Then, the parameter determination unit 314 controls the recognition apparatus 2b (especially, the recognition unit 211) to perform the above described recognition operation on each of the recognition target images 200 the number of which is equal to or larger than the predetermined number generated at the step S331 (a step S322). The recognized result information indicating the result of the recognition operation is accumulated in the recognized result DB 222 of the storage apparatus 22.

After the recognition operation on the recognition target images 200 the number of which is equal to or larger than the predetermined number is completed, the recognized result obtaining unit 312 obtains the recognized result information indicating the result of the recognition operation at the step S322 from the recognition apparatus 2b through the communication apparatus 33 (a step S323).

Then, the evaluation unit 313 calculates an evaluation value for evaluating whether or not the image generation parameter 300 that is actually set (in other words, applied) to the recognition apparatus 2b at the step S322 is proper based on the recognized result information obtained at the step S323 (a step S324). Namely, the evaluation unit 313 calculates an evaluation value for evaluating the recognition operation that is performed on the recognition target image 200 generated based on the image generation parameter 300 set at the step S320. Note that the evaluation value used in the second example embodiment may be same as the evaluation value used in the first example embodiment, and thus, a detailed description thereof is omitted. Namely, the process at the step S324 may be same as the process at the above described step S314. However, in the second example embodiment, the precision indicates a ratio of the number of the recognition target image 200 in which the authentication of the person succeeds relative to the number of the recognition target images 200 from which the face of the person is detected, and the recall indicates a ratio of the number of the recognition target image 200 in which the authentication of the person succeeds relative to the number of the recognition target images 200 in which the person is included (namely, a total number of the recognition target images 200 in which the person should be authenticated, and a total number of the ground truth data corresponding to the recognition target images 100 that are sources of the recognition target images 200), because the recognition operation is performed on the recognition target image 200 instead of the recognition target image 100.

Then, the parameter determination unit 314 determines whether or not the variable number r is zero (a step S325). As a result of the determination at the step S325, when it is determined that the variable number r is zero (the step S325:

Yes), the parameter determination unit 314 records, in the parameter DB 321, the information related to the image generation parameter 300 set at the step S320 (a step S327). The information related to the image generation parameter 300 may include an information indicating the value of the image generation parameter 300 set at the step S320 and an information indicating the evaluation value calculated at the step S324, for example.

The information related to the image generation parameter 300 recorded in the parameter DB 321 corresponds to the information related to the image generation parameter 300 that should be used by the recognition apparatus 2b to generate the recognition target image 200 (namely, the image generation parameter 300 that should be set to the recognition apparatus 2b). Thus, after the parameter determination operation illustrated in FIG. 7 is completed, the values of the image generation parameter 300 recorded in the parameter DB 321 is actually set to the recognition apparatus 2b. Namely, after the parameter determination operation illustrated in FIG. 7 is completed, the recognition apparatus 2b generates the recognition target image 200 based on the image generation parameter 300 recorded in the parameter DB 321.

Then, the parameter setting unit 311 determines whether or not all candidate value for the image generation parameter 300 that should be set to the recognition apparatus 2b in the parameter determination operation is actually set to the recognition apparatus 2b (a step S328). For example, in a situation where a first candidate value to a fifth candidate value should be set to the recognition apparatus 2b as the image generation parameters 300 in the parameter determination operation, the parameter setting unit 311 determines whether or not each of the first candidate value to the fifth candidate value is actually set to the recognition apparatus 2b as the image generation parameter 300.

As a result of the determination at the step S328, when it is determined that all candidate value for the image generation parameter 300 that should be set to the recognition apparatus 2b in the parameter determination operation is not yet set to the recognition apparatus 2b (the step S328: No), the parameter setting unit 311 increments the variable number r by one (a step S329), and set the image generation parameter 300 having new value (namely, new candidate value for the image generation parameter 300) to the recognition apparatus 2b (the step S320). Then, the processes of the step S331 and after the step S331 are repeated.

On the other hand, as a result of the determination at the step S328, when it is determined that all candidate value for the image generation parameter 300 that should be set to the recognition apparatus 2b in the parameter determination operation is already set to the recognition apparatus 2b (the step S328: Yes), the parameter determination apparatus 3 ends the parameter determination operation illustrated in FIG. 7.

On the other hand, as a result of the determination at the step S325, when it is determined that the variable number r is not zero (the step S325: No), the information related to the image generation parameter 300 is already recorded in the parameter DB 321. In this case, the parameter determination unit 314 determines whether or not the evaluation value that is newly calculated at the step S324 is better than the evaluation value that is recorded in the parameter DB 321 with it to be associated with the information indicating the image generation parameter 300 (a step S326). Namely, the parameter determination unit 314 determines whether or not the evaluation value corresponding to the image generation parameter 300 that is newly set at the step S320 is better than the evaluation value corresponding to the image generation parameter 300 that is recorded in the parameter DB 321. Note that the evaluation value being better at the step S326 may mean the recognition accuracy of the face of the person and/or the authentication accuracy of the person, as with the above described step S316.

As a result of the determination at the step S326, when it is determined that the evaluation value is better (the step S326: Yes), it is estimated that the result of the recognition operation using the recognition target image 200 generated based on the image generation parameter 300 that is newly set at the step S320 is better than the result of the recognition operation using the recognition target image 200 generated based on the image generation parameter 300 that is recorded in the parameter DB 321. In this case, the parameter determination unit 314 newly records, in the parameter DB 321, the information related to the image generation parameter 300 that is newly set at the step S320 (the step S327). Namely, the parameter determination unit 314 rewrites (namely, update) the information related to the image generation parameter 300 that is recorded in the parameter DB 321 by the information related to the image generation parameter 300 that is newly set at the step S320.

On the other hand, as a result of the determination at the step S326, when it is determined that the evaluation value is not better (the step S326: No), it is estimated that the result of the recognition operation using the recognition target image 200 generated based on the image generation parameter 300 that is recorded in the parameter DB 321 is better than the result of the recognition operation using the recognition target image 200 generated based on the image generation parameter 300 that is newly set at the step S320. In this case, the parameter determination unit 314 does not newly record, in the parameter DB 321, the information related to the image generation parameter 300 that is newly set at the step S320. Namely, the information related to the image generation parameter 300 that is recorded in the parameter DB 321 is kept being recorded in the parameter DB 321 as it is.

(2-3) Technical Effect of Recognition System SYSb

As described above, the recognition system SYSb (especially, the parameter determination apparatus 3) in the second example embodiment is capable of determining the image generation parameter 300 by using the recognized result information indicating the recognized result of the recognition operation. Namely, the parameter determination apparatus 3 is capable of determining the value of the image generation parameter 300 that should be set to the recognition apparatus 2b. Thus, the parameter determination apparatus 3 is capable of determining the value of the image generation parameter 300 by which the recognition target image 200 that is easy to be recognized by the recognition apparatus 2b is generable. Namely, the parameter determination apparatus 3 is capable of determining the value of the image generation parameter 300 that is used to generate the recognition target image 200 so that the recognition unit 211 performs the recognition operation by using the recognition target image 200 that is easy to be recognized by the recognition apparatus 2b. Thus, when the parameter determination operation is performed, the image processing unit 212b is capable of generating the recognition target image 200 that is easier to be recognized by the recognition unit 211, compared to the case where the parameter determination operation is not performed. Furthermore, when the parameter determination operation is performed, the recognition unit 211 is capable of performing more proper recognition operation by using the recognition target image 200 that is easier to be recognized by the recognition unit 211, compared to the case where the parameter determination operation is not performed.

Note that the parameter determination apparatus 3 may determine the image generation parameter 300 related to the recognition apparatus 2b (specifically, the processing parameter 303b) after determining the image generation parameters 300 related to the imaging apparatus 1 (specifically, the optical parameter 301 and the processing parameter 302). This is because the image processing unit 212b performs the image processing on the recognition target image 100 transmitted from the imaging apparatus 1, and thus, there is a possibility that the value of the image generation parameter 300 related to the recognition apparatus 2b is needed to be changed when the value of the image generation parameter 300 related to the imaging apparatus 1 is changed. Thus, when the image generation parameter 300 related to the recognition apparatus 2b is determined after the image generation parameter 300 related to the imaging apparatus 1 is determined, the parameter determination apparatus 3 is capable of determining the image generation parameter 300 related to the recognition apparatus 2b in a situation where the value of the image generation parameter 300 related to the imaging apparatus 1 is fixed. Thus, the parameter determination apparatus 3 is capable of determining the image generation parameter 300 relatively effectively.

Moreover, in the second example embodiment, the recognition target image 300 that is generated by the image processing unit 212b performing the image processing on the recognition target image 100 may be stored in the image DB 221 of the storage apparatus 22, in addition to or instead of the recognition target image 100 obtained from the imaging apparatus 1.

Moreover, as described above, the image processing unit 212b of the recognition apparatus 2b sometimes performs one type of image processing that is same as the image processing performed by the image processing unit 121 of the imaging apparatus 1. In this case the parameter determination apparatus 3 may determine the parameter that specifies a detail of the one type of image processing performed by either one of the image processing units 121 and 212b and may not determine the parameter that specifies a detail of the one type of image processing performed by the other one of the image processing units 121 and 212b. In this case, the parameter that specifies a detail of the one type of image processing performed by the other one of the image processing units 121 and 212b may be set to be a default value (for example, the initial value). Even in this case, the fact remains that the recognition target image 200 that is easy to be recognized by the recognition apparatus 2b is generated, because the parameter that specifies a detail of the one type of image processing performed by either one of the image processing units 121 and 212b is determined based on the recognition target image 200 that is generated by the one type of image processing performed by the image processing unit 121 and the one type of image processing performed by the image processing unit 212b. Alternatively, the parameter determination apparatus 3 may determine the parameter that specifies a detail of the one type of image processing performed by the image processing unit 212b so that the image processing unit 212b does not perform the one type of image processing. This is because the one type of image processing is performed by the image processing unit 121 even when the one type of image processing is not performed by the image processing unit 212b, and thus, the fact remains that the recognition target image 200 that is eventually generated is the image on which the one type of image processing is already performed.

(3) Recognition System SYS in Third Example Embodiment

Figure 8:
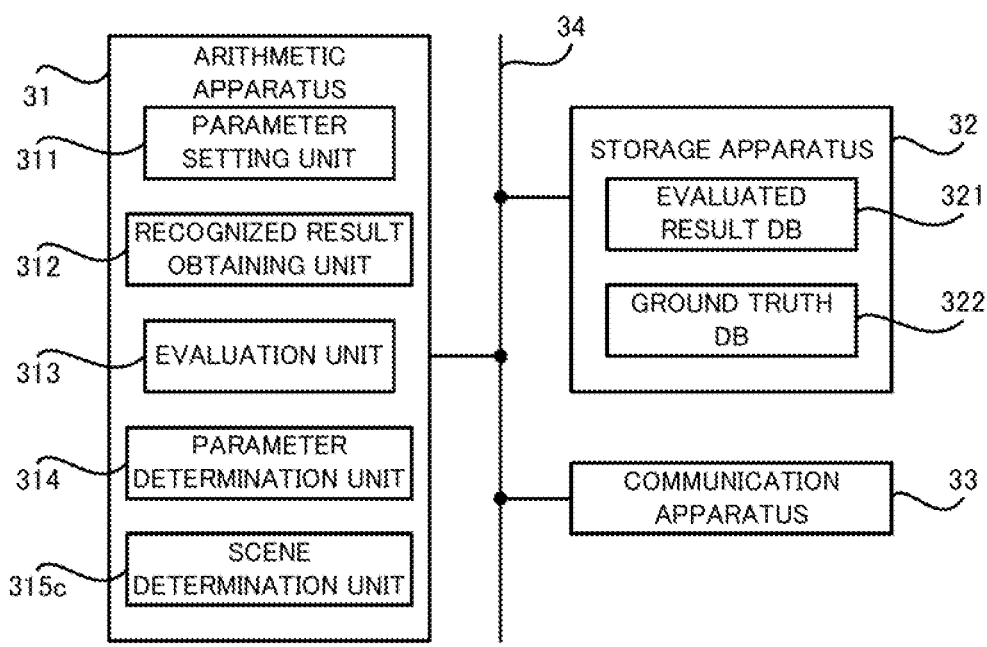
FIG. 8 is a block diagram that illustrates a configuration of a parameter determination apparatus in a third example embodiment.

Next, the recognition system SYS in a third example embodiment will be described. Hereinafter, the recognition system SYS in the third example embodiment is referred to as a "recognition system SYSc". The recognition system SYSc in the third example embodiment is different from the recognition system SYSa in the first example embodiment in that is includes a parameter determination apparatus 3c instead of the parameter determination apparatus 3. Another feature of the recognition system SYSc may be same as another feature of the recognition system SYSa. Thus, in the below described description, with reference to FIG. 8, a configuration of the parameter determination apparatus 3c in the third example embodiment will be described. FIG. 8 is a block diagram that illustrates the configuration of the parameter determination apparatus 3c in the third example embodiment. Note that a detailed description of the component that is already described is omitted by assigning the same reference number thereto.

As illustrated in FIG. 8, the parameter determination apparatus 3c is different from the above described parameter determination apparatus 3 in that a scene determination unit 315c is implemented in the arithmetic apparatus 31. Another feature of the parameter determination apparatus 3c may be same as another feature of the parameter determination apparatus 3.

The scene determination unit 315c determines a scene of the recognition target image 100. For example, the scene determination unit 315c analyzes the recognition target image 100 to determine, as the scene of the recognition target image 100, either one of a plurality of types of scenes that are set in advance. Note that the scene determination unit 315c may determine the scene of the recognition target image 100 by using an existing method of determining a scene of an image. Thus, a detailed description of the method of determining the scene of the recognition target image 100 is omitted.

The scene determined by the scene determination unit 315c may be used to select the image generation parameter 300 the value of which should be determined by the parameter determination unit 314. Namely, the parameter determination unit 314 may select, based on the scene determined by the scene determination unit 315c, at least one image generation parameter 300 the value of which should be determined by the parameter determination unit 314 in the above described parameter determination operation from the plurality of types of image generation parameters 300.

For example, when the scene determined by the scene determination unit 315c is a foggy and/or misted scene, the parameter determination unit 314 may select, as the image generation parameter 300 the value of which should be determined, at least one of the parameter that specifies a detail of the white balance correction processing, the parameter that specifies a detail of the brightness correction processing, the parameter that specifies a detail of the contrast correction processing, the parameter that specifies a detail of the dehaze processing, the parameter that specifies a detail of the HDR processing and the parameter that specifies a detail of the denoise processing. For example, when the scene determined by the scene determination unit 315c is not the foggy and/or misted scene, the parameter determination unit 314 may not select, as the image generation parameter 300 the value of which should be determined, the parameter that specifies a detail of the dehaze processing.

For example, when the scene determined by the scene determination unit 315c is a scene in which an image of a backlit person is captured, the parameter determination unit 314 may select, as the image generation parameter 300 the value of which should be determined, at least one of the parameter that specifies a detail of the white balance correction processing, the parameter that specifies a detail of the brightness correction processing, the parameter that specifies a detail of the contrast correction processing, the parameter that specifies a detail of the HDR processing and the parameter that specifies a detail of the denoise processing. On the other hand, for example, when the scene determined by the scene determination unit 315c is the scene in which the image of the backlit person is captured, the parameter determination unit 314 may not select, as the image generation parameter 300 the value of which should be determined, the parameter that specifies a detail of the dehaze processing. For example, when the scene determined by the scene determination unit 315c is a scene in which an image of a follow-lighting person is captured, the parameter determination unit 314 may not select, as the image generation parameter 300 the value of which should be determined, the parameter that specifies a detail of the HDR processing.

For example, when the scene determined by the scene determination unit 315c is a relatively dark scene (for example, a night), the parameter determination unit 314 may select, as the image generation parameter 300 the value of which should be determined, at least one of the parameter that specifies a detail of the white balance correction processing, the parameter that specifies a detail of the brightness correction processing, the parameter that specifies a detail of the contrast correction processing, the parameter that specifies a detail of the HDR processing and the parameter that specifies a detail of the denoise processing. On the other hand, for example, when the scene determined by the scene determination unit 315c is the relatively dark scene, the parameter determination unit 314 may not select, as the image generation parameter 300 the value of which should be determined, the parameter that specifies a detail of the dehaze processing.

For example, when the scene determined by the scene determination unit 315c is a relatively light scene (for example, a daytime), the parameter determination unit 314 may select, as the image generation parameter 300 the value of which should be determined, at least one of the parameter that specifies a detail of the white balance correction processing, the parameter that specifies a detail of the brightness correction processing, the parameter that specifies a detail of the contrast correction processing, the parameter that specifies a detail of the HDR processing and the parameter that specifies a detail of the denoise processing. On the other hand, for example, when the scene determined by the scene determination unit 315c is the relatively light scene, the parameter determination unit 314 may not select, as the image generation parameter 300 the value of which should be determined, the parameter that specifies a detail of the dehaze processing.

In this case, the parameter determination unit 314 may determine the value of at least one image generation parameter 300 that is selected and may not determine the value of at least other one image generation parameter 300 that is not selected. The image generation parameter 300 that is not selected may be set to be the default value (for example, the initial value). Alternatively, when the image generation parameter 300 that is not selected is the parameter related to the image processing, the image generation parameter 300 that is not selected may be set to be a value specifying that the image processing corresponding to this image generation parameter 300 is not performed. Namely, the default value of the image generation parameter 300 in the third example embodiment may be set to be the value specifying that the image processing corresponding to this image generation parameter 300 is not performed. As a result, a processing load of the parameter determination apparatus 3c is reduced, compared to a case where all of the values of the plurality of types of the image generation parameters 300 are determined one by one based on the evaluation value. Namely, the recognition system SYSc is capable of reducing the processing load of the parameter determination apparatus 3c while achieving an effect that is same as the effect achievable by the recognition system SYSa.

When the image generation parameter 300 specifies a detail of the image processing, the scene determined by the scene determination unit 315c may be used to determine an intensity of the image processing corresponding to the image generation parameter 300. Namely, the parameter determination unit 314 may determine the value of the image generation parameter 300 so that the intensity of the image processing is set to be an intensity based on the scene determined by the scene determination unit 315c.

For example, when the scene determined by the scene determination unit 315c is the foggy and/or misted scene, the parameter determination unit 314 may determine the image generation parameter 300 that specifies a detail of the dehaze processing so that the intensity of the dehaze processing is set to be a relatively stronger intensity, compared to a case where the scene determined by the scene determination unit 315c is another scene. For example, when the scene determined by the scene determination unit 315c is the scene in which the image of the backlit person is captured, the parameter determination unit 314 may determine the image generation parameter 300 that specifies a detail of the HDR processing so that the intensity of the HDR processing is set to be a relatively stronger intensity, compared to a case where the scene determined by the scene determination unit 315c is another scene. For example, when the scene determined by the scene determination unit 315c is the relatively dark scene (for example, the night), the parameter determination unit 314 may determine the image generation parameter 300 that specifies at least one of the white balance correction processing, the brightness correction processing, the contrast correction processing, the dehaze processing, the HDR processing and the denoise processing so that the intensity of at least one of the white balance correction processing, the brightness correction processing, the contrast correction processing, the dehaze processing, the HDR processing and the denoise processing is set to be a relatively stronger intensity, compared to a case where the scene determined by the scene determination unit 315c is another scene. For example, when the scene determined by the scene determination unit 315c is the relatively light scene (for example, the daytime), the parameter determination unit 314 may determine the image generation parameter 300 that specifies at least one of the white balance correction processing, the brightness correction processing and the contrast correction processing, the dehaze processing, the HDR processing and the denoise processing so that the intensity of at least one of the white balance correction processing, the brightness correction processing and the contrast correction processing is set to be a relatively stronger intensity and the intensity of at least one of the dehaze processing, the HDR processing and the denoise processing is set to be a relatively weaker intensity, compared to a case where the scene determined by the scene determination unit 315c is another scene. In this case, the parameter determination unit 314 is capable of properly determining the value of the image generation parameter 300 based on the scene.

Incidentally, the feature described in the third example embodiment (specifically, the feature related to the scene determination unit 315c) may be applied to the second example embodiment.

(4) Modified Example

Figure 9:
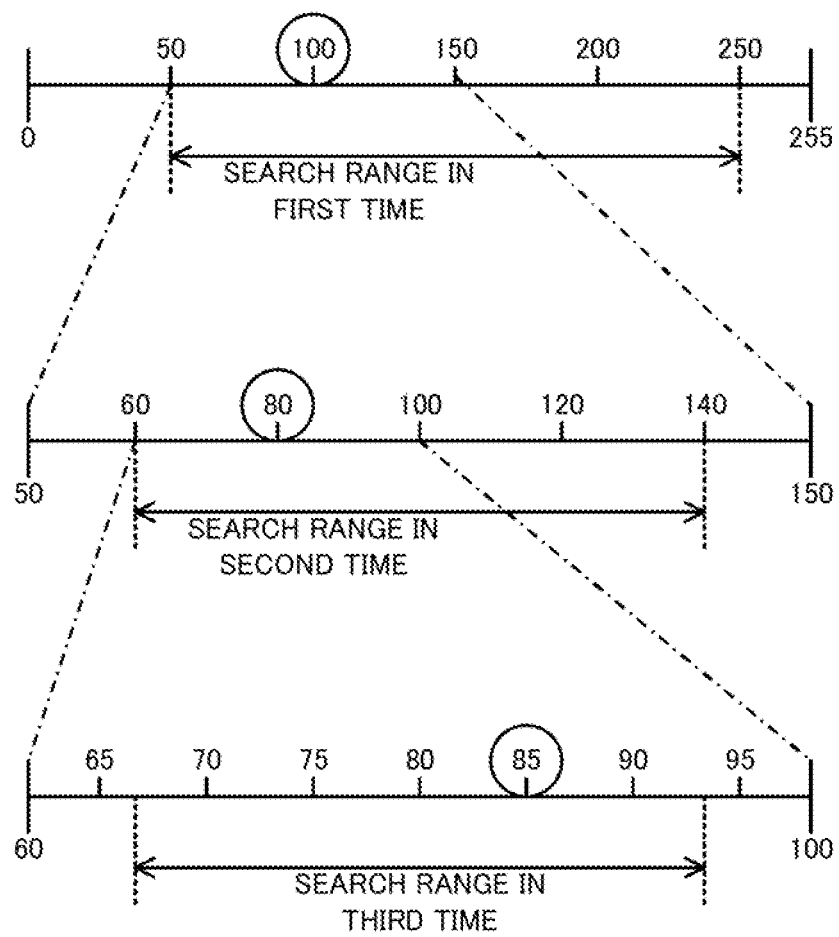
FIG. 9 is a planar view that illustrates a candidate value of an image generation parameter that should be set to the imaging apparatus or the recognition apparatus by the parameter determination operation.

In the above described description, it can be said that the parameter determination apparatus 3 searches the value (the candidate value) of the image generation parameter 300 by which the evaluation value is the best while actually setting, to the imaging apparatus 1 or the recognition apparatus 2, all of the candidate values of the image generation parameter 300 that should be set to the imaging apparatus 1 or the recognition apparatus 2 in the parameter determination operation. In this case, the parameter determination apparatus 3 may repeat an operation for fining a granularity of the candidate values of the image generation parameter 300 and for searching the value of the image generation parameter 300 by which the evaluation value is the best while actually setting, to the imaging apparatus 1 or the recognition apparatus 2, the candidate value having fined granularity each time the search of the value of the image generation parameter 300 by which the evaluation value is the best is completed (for example, each time it is determined to be Yes at the step S318 in FIG. 5 or the step S328 in FIG. 7). For example, as illustrated in FIG. 9, an operation for searching the value of the image generation parameter 300 by which the evaluation value is the best while actually setting, to the imaging apparatus 1 or the recognition apparatus 2, five candidate values (specifically, five candidate values including 50, 100, 150, 200 and 250) related to one type of image generation parameter 300. In this situation, it is assumed that the candidate value "100" is searched as the value of the image generation parameter 300 by which the evaluation value is the best. In this case, the parameter determination apparatus 3 may set a plurality of candidate values having fined granularity around the candidate value "100" that is determined as the value of the image generation parameter 300 by which the evaluation value is the best. For example, in an example illustrated in FIG. 9, the parameter determination apparatus 3 newly sets five candidate values including 60, 80, 100, 120 and 140. As a result, it is assumed that the candidate value "80" is searched as the value of the image generation parameter 300 by which the evaluation value is the best. In this case, the parameter determination apparatus 3 may set a plurality of candidate values having more fined granularity around the candidate value "80" that is determined as the value of the image generation parameter 300 by which the evaluation value is the best. For example, in an example illustrated in FIG. 9, the parameter determination apparatus 3 newly sets seven candidate values including 65, 70, 75, 80, 85, 90 and 90. As a result, it is assumed that the candidate value "85" is searched as the value of the image generation parameter 300 by which the evaluation value is the best. Thus, the value "85", by which the evaluation value is better than that of the value "100" that is determined as the value of the image generation parameter 300 by which the evaluation value is the best in a situation where the granularity of the image generation parameter 300 is fixed, is determined as the value of the image generation parameter 300. Thus, the parameter determination apparatus 3 is capable of the image generation parameter 300 by which the recognition target image 100 that is easier to be recognized by the recognition apparatus 2 is generable.

Moreover, in the first example embodiment to the third example embodiment described above, the imaging apparatus 1 includes the image processing unit 121. However, the imaging apparatus 1 may not include the image processing unit 121. In this case, the parameter determination apparatus 3 may not determine the image generation parameter 300 of the image processing unit 121 (namely, the processing parameter 302). Alternatively, the parameter determination apparatus 3 may not determine the image generation parameter 300 of the image processing unit 121 (namely, the processing parameter 302) even when the imaging apparatus 1 includes the image processing unit 121. In this case, the processing parameter 302 of the image processing unit 121 may remain to be the initial value. Moreover, in the first example embodiment to the third example embodiment described above, the parameter determination apparatus 3 determines the image generation parameter 300 of the camera 11 (namely, the optical parameter 301). However, the parameter determination apparatus 3 may not determine the image generation parameter 300 of the camera 11 (namely, the optical parameter 301). In this case, the optical parameter 301 of the camera 11 may remain to be the initial value.

(5) Supplementary Note

With respect to the example embodiments described above, the following Supplementary Notes will be further disclosed. A part or whole of the above described example embodiments may be described as the below described Supplementary Note, however, is not limited to the following.

Supplementary Note 1

A parameter determination apparatus including:
 a calculation unit that is configured to calculate, based on a recognized result of a plurality of recognition target images by a recognition apparatus that performs a recognition operation on the recognition target image, an evaluation value for evaluating the recognized result; and
 a determination unit that is configured to determine, based on the evaluation value, an image generation parameter that is used to generate the recognition target image.

Supplementary Note 2

The parameter determination apparatus according to Supplementary Note 1, wherein
 the recognition target image is generated by an image processing unit of the recognition apparatus performing a first image processing on an image that is inputted from an imaging apparatus including a camera to the recognition apparatus,
 the image generation parameter includes a first processing parameter that specifies a detail of the first image processing.

Supplementary Note 3

The parameter determination apparatus according to Supplementary Note 1 or 2, wherein the recognition target image is inputted to the recognition apparatus from an imaging apparatus including a camera, the image generation parameter includes an optical parameter that specifies an optical characteristic of the camera.

Supplementary Note 4

The parameter determination apparatus according to any one of Supplementary Notes 1 to 3, wherein
the recognition target image is inputted to the recognition apparatus from an imaging apparatus including a camera and an image processing unit that generates the recognition target image by performing a second image processing on an image captured by the camera,
the image generation parameter includes a second processing parameter that specifies a detail of the second image processing.

Supplementary Note 5

The parameter determination apparatus according to Supplementary Note 4, wherein
the image generation parameter includes an optical parameter that specifies an optical characteristic of the camera,
the determination unit determines the optical parameter and then determines the second processing parameter.

Supplementary Note 6

The parameter determination apparatus according to any one of Supplementary Notes 1 to 5, wherein
the recognition target image is inputted to the recognition apparatus from an imaging apparatus including a camera and an image processing unit that generates the recognition target image by performing a second image processing on an image captured by the camera,
the recognition apparatus performs, by using an image processing unit of the recognition apparatus, a first image processing on the recognition target image inputted from the imaging apparatus, and recognizes the recognition target image on which the first imaging processing is performed,
the image generation parameter includes a first processing parameter that specifies a detail of the first image processing and a second processing parameter that specifies a detail of the second image processing,
the determination unit determines the second processing parameter and then determines the first processing parameter.

Supplementary Note 7

The parameter determination apparatus according to any one of Supplementary Notes 1 to 6 further including a scene determination unit that is configured to determine a scene of the recognition target image,
the determination unit determining at least one of a plurality of image generation parameters that is selected based on the determined scene, and not determining at least residual one of the plurality of image generation parameters that is not selected.

Supplementary Note 8

The parameter determination apparatus according to any one of Supplementary Notes 1 to 7, wherein
the image generation parameter specifies a detail of an image processing that is performed to generate the recognition target image,
the parameter determination apparatus includes a scene determination unit that is configured to determine a scene of the recognition target image,
the determination unit determines the image generation parameter so that an intensity of the image processing becomes an intensity based on the determined scene.

Supplementary Note 9

A parameter determination method including:
calculating, based on a recognized result of a plurality of recognition target images by a recognition apparatus that recognizes the recognition target image, an evaluation value for evaluating the recognized result; and
determining, based on the evaluation value, an image generation parameter that is used to generate the recognition target image.

Supplementary Note 10

A non-transitory recording medium on which a computer program that allows a computer to execute a parameter determination method is recorded,
the parameter determination method including:
calculating, based on a recognized result of a plurality of recognition target images by a recognition apparatus that recognizes the recognition target image, an evaluation value for evaluating the recognized result; and
determining, based on the evaluation value, an image generation parameter that is used to generate the recognition target image.

Supplementary Note 11

A computer program that allows a computer to execute a parameter determination method,
the parameter determination method including:
calculating, based on a recognized result of a plurality of recognition target images by a recognition apparatus that recognizes the recognition target image, an evaluation value for evaluating the recognized result; and
determining, based on the evaluation value, an image generation parameter that is used to generate the recognition target image.

The present disclosure is allowed to be changed, if desired, without departing from the essence or spirit of the invention which can be read from the claims and the entire specification, and a parameter determination apparatus, a parameter determination method and a recording medium, which involve such changes, are also intended to be within the technical scope of the present disclosure.

DESCRIPTION OF REFERENCE CODES

SYS recognition system
1 imaging apparatus
11 camera
12 arithmetic apparatus
121 image processing unit
2, 2b recognition apparatus 21 arithmetic apparatus
211 recognition unit
212b image processing unit
3 parameter determination apparatus
31 arithmetic apparatus
311 parameter setting unit
312 a recognized result obtaining unit
313 evaluation unit
314 parameter determination unit
100, 200 recognition target image
101 captured image
300 image generation parameter
301 optical parameter
302, 303b processing parameter

What is claimed is:

1. A parameter determination apparatus comprising:
at least one memory storing instructions; and
at least one first processor configured to execute the instructions to:
calculate, based on a recognized result of detecting a recognition target included in a plurality of recognition target images by a recognition apparatus that performs a recognition operation on each recognition target image, and based on an authentication result of authenticating the recognition target, an evaluation value for evaluating the recognized result and the authentication result, wherein the evaluation value is determined based on a precision and recall; and
determine, based on the evaluation value, an image generation parameter that was used to generate the recognition target image, wherein
the precision indicates a ratio of a number of the recognition target images in which authentication of the recognition target is successful to a number of the recognition target images in which the recognition target is detected, and
the recall indicates a ratio of a number of the recognition target images in which the authentication of the recognition target is successful to a total number of the recognition target images in which the recognition target is actually included.

2. The parameter determination apparatus according to claim 1, wherein
the recognition target image is generated by a second processor of the recognition apparatus performing a first image processing on an image that is inputted from an imaging apparatus including a camera to the recognition apparatus,
the image generation parameter includes a first processing parameter that specifies a detail of the first image processing.

3. The parameter determination apparatus according to claim 1, wherein
the recognition target image is inputted to the recognition apparatus from an imaging apparatus including a camera,
the image generation parameter includes an optical parameter that specifies an optical characteristic of the camera.

4. The parameter determination apparatus according to claim 1, wherein
the recognition target image is inputted to the recognition apparatus from an imaging apparatus including a camera and a third processor configured to execute instructions to generate the recognition target image by performing a second image processing on an image captured by the camera,
the image generation parameter includes a second processing parameter that specifies a detail of the second image processing.

5. The parameter determination apparatus according to claim 4, wherein
the image generation parameter includes an optical parameter that specifies an optical characteristic of the camera,
the at least one first processor is configured to execute the instructions to determine the optical parameter and then determine the second processing parameter.

6. The parameter determination apparatus according to claim 1, wherein
the recognition target image is inputted to the recognition apparatus from an imaging apparatus including a camera and a third processor configured to execute instructions to generate the recognition target image by performing a second image processing on an image captured by the camera,
the recognition apparatus performs, by using a second processor of the recognition apparatus, a first image processing on the recognition target image inputted from the imaging apparatus, and recognizes the recognition target image on which the first imaging processing is performed,
the image generation parameter includes a first processing parameter that specifies a detail of the first image processing and a second processing parameter that specifies a detail of the second image processing,
the at least one first processor is configured to execute the instructions to determine the second processing parameter and then determine the first processing parameter.

7. The parameter determination apparatus according to claim 1, wherein
the at least one first processor is configured to execute the instructions:
to identify a scene of the recognition target image; and
to determine at least one of a plurality of image generation parameters that is selected based on the identified scene, and not to determine at least residual one of the plurality of image generation parameters that is not selected.

8. The parameter determination apparatus according to claim 1, wherein
the image generation parameter specifies a detail of an image processing that is performed to generate the recognition target image,
the at least one first processor is configured to execute the instructions:
to identify a scene of the recognition target image; and
to determine the image generation parameter so that an intensity of the image processing becomes an intensity based on the identified scene.

9. A parameter determination method performed by a computer and comprising:
calculating, based on a recognized result of detecting a recognition target included in a plurality of recognition target images by a recognition apparatus that performs a recognition operation on each recognition target image, and based on an authentication result of authenticating the recognition target, an evaluation value for evaluating the recognized result and the authentication result, wherein the evaluation value is determined based on a precision and recall; and
determining, based on the evaluation value, an image generation parameter that was used to generate the recognition target image, wherein the precision indicates a ratio of a number of the recognition target images in which authentication of the recognition target is successful to a number of the recognition target images in which the recognition target is detected, and the recall indicates a ratio of a number of the recognition target images in which the authentication of the recognition target is successful to a total number of the recognition target images in which the recognition target is actually included.

10. A non-transitory recording medium storing a computer program executable by a computer to perform a parameter determination method comprising:

calculating, based on a recognized result of detecting a recognition target included in a plurality of recognition target images by a recognition apparatus that performs a recognition operation on each recognition target image, and based on an authentication result of authenticating the recognition target, an evaluation value for evaluating the recognized result and the authentication result, wherein the evaluation value is determined based on a precision and recall; and determining, based on the evaluation value, an image generation parameter that was used to generate the recognition target image, wherein the precision indicates a ratio of a number of the recognition target images in which authentication of the recognition target is successful to a number of the recognition target images in which the recognition target is detected, and the recall indicates a ratio of a number of the recognition target images in which the authentication of the recognition target is successful to a total number of the recognition target images in which the recognition target is actually included.

11. The parameter determination apparatus according to claim 1, wherein the at least one first processor configured to execute the instructions to repeat an operation for fining a granularity of a candidate values of the image generation parameter and for searching a value of the image generation parameter by which the evaluation value is best while setting, to an imaging apparatus or the recognition apparatus, the candidate value having the fined granularity each time the search of the value of the image generation parameter by which the evaluation value is the best is completed, the evaluation value is defined by an equation (2×precision×recall)/(precision+recall", and the image generation parameter includes at least one of a parameter that specifies a detail of a white balance correction processing, a parameter that specifies a detail of a brightness correction processing, a parameter that specifies a detail of a contrast correction processing, a parameter that specifies a detail of a dehaze processing, a parameter that specifies a detail of a HDR processing, a parameter that specifies a detail of a denoise processing and a parameter that specifies a detail of a skeleton texture decomposition processing.

12. The parameter determination apparatus according to claim 7, wherein the at least one first processor configured to execute the instructions to:

in case the identified scene is a foggy and/or misted scene, select, as the image generation parameter, at least one of a parameter that specifies a detail of a white balance correction processing, a parameter that specifies a detail of a brightness correction processing, a parameter that specifies a detail of a contrast correction processing, a parameter that specifies a detail of a dehaze processing, a parameter that specifies a detail of a HDR processing and a parameter that specifies a detail of a denoise processing;

in case the identified scene is not the foggy and/or misted scene, not select, as the image generation parameter, the parameter that specifies the detail of the dehaze processing;

in case the identified scene is a scene in which an image of a backlit person is captured, select, as the image generation parameter, at least one of the parameter that specifies the detail of the white balance correction processing, the parameter that specifies the detail of the brightness correction processing, the parameter that specifies the detail of the contrast correction processing, the parameter that specifies the detail of the HDR processing and the parameter that specifies the detail of the denoise processing;

in case the identified scene is the scene in which the image of the backlit person is captured, not select, as the image generation parameter, the parameter that specifies the detail of the dehaze processing;

in case the identified scene is a scene in which an image of a follow-lighting person is captured, not select, as the image generation parameter, the parameter that specifies the detail of the HDR processing;

in case the identified scene is a relatively dark scene, select, as the image generation parameter, at least one of the parameter that specifies the detail of the white balance correction processing, the parameter that specifies the detail of the brightness correction processing, the parameter that specifies the detail of the contrast correction processing, the parameter that specifies the detail of the HDR processing and the parameter that specifies the detail of the denoise processing; and in case the identified scene is the relatively dark scene, not select, as the image generation parameter, the parameter that specifies the detail of the dehaze processing.

* * * * *